April 3, 1951     W. F. SPANG     2,547,234
MEAT TENDERIZING MACHINE
Filed July 16, 1948     3 Sheets-Sheet 1
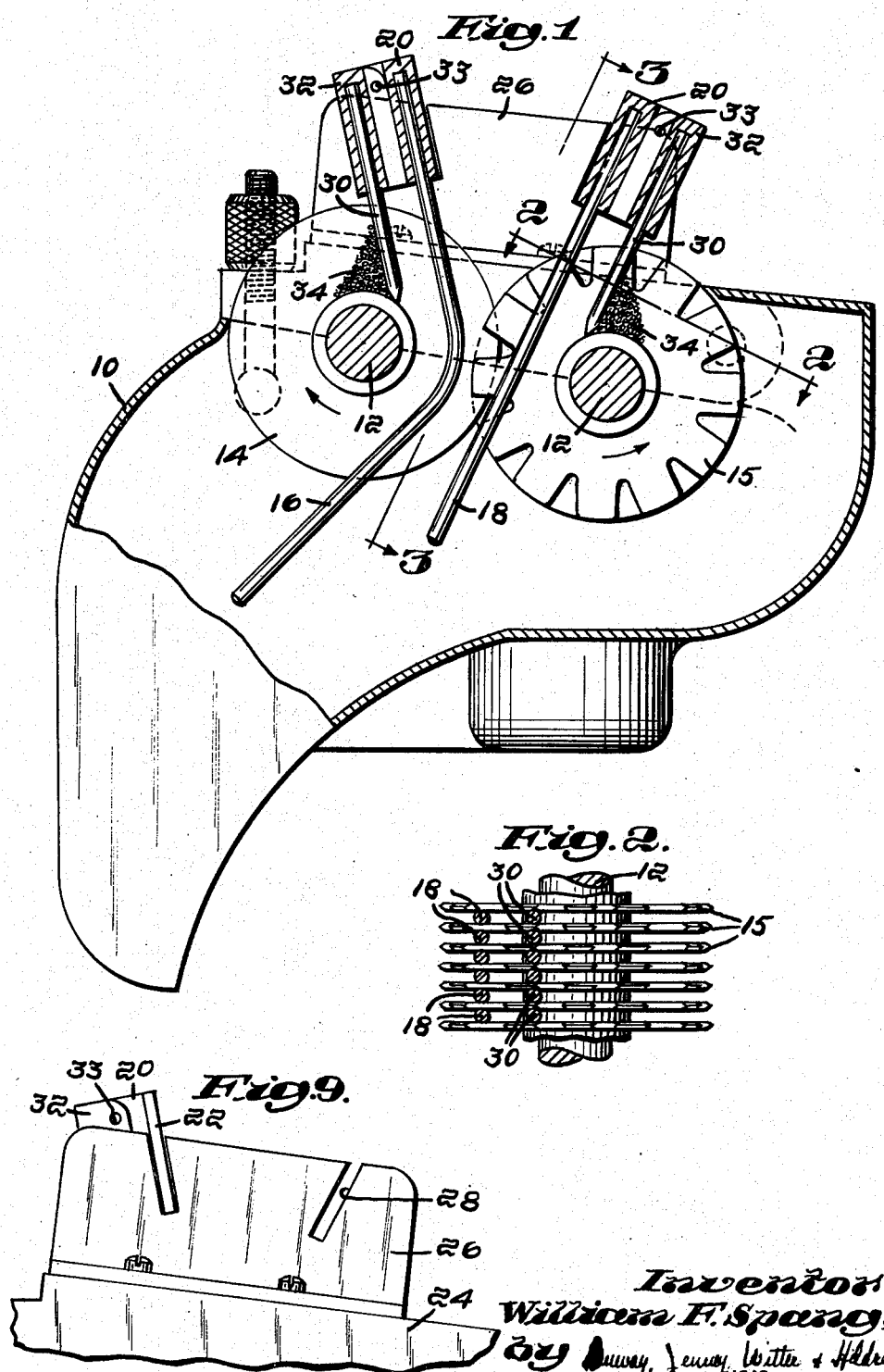
Inventor:
William F. Spang,
by Dunway, Jenney, Witter & Hildreth
Attorneys April 3, 1951  W. F. SPANG  2,547,234
MEAT TENDERIZING MACHINE
Filed July 16, 1948  3 Sheets-Sheet 2
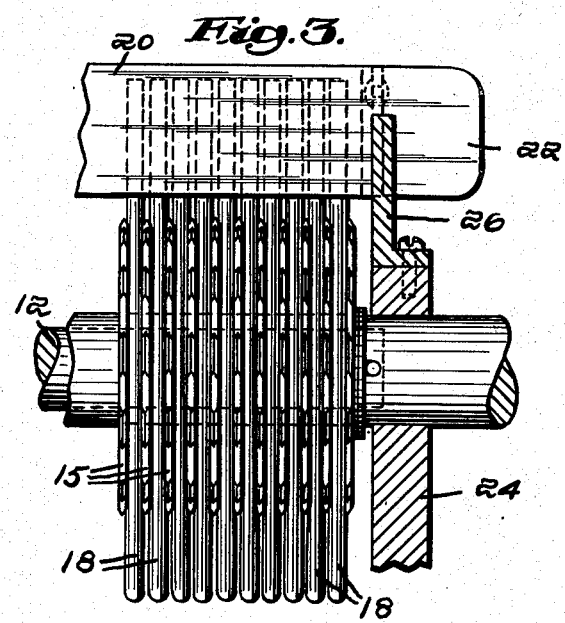
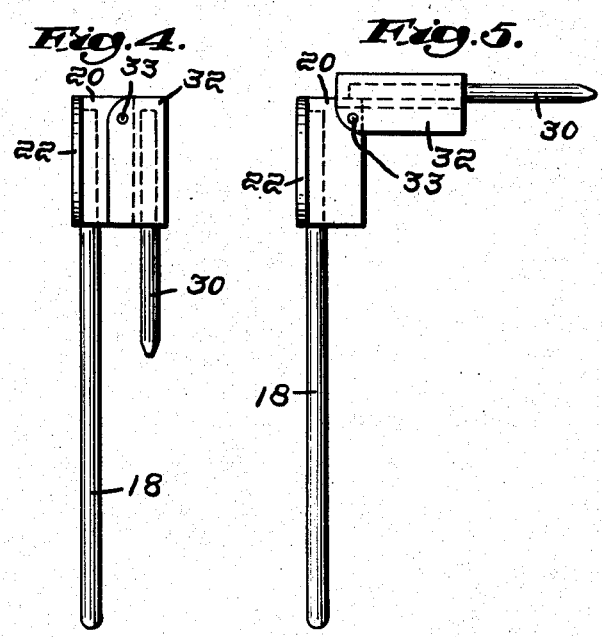
Inventor:
William F. Spang,
by Kenway, Jenney, Witter & Hildreth
Attorneys April 3, 1951 W. F. SPANG 2,547,234
MEAT TENDERIZING MACHINE
Filed July 16, 1948 3 Sheets-Sheet 3
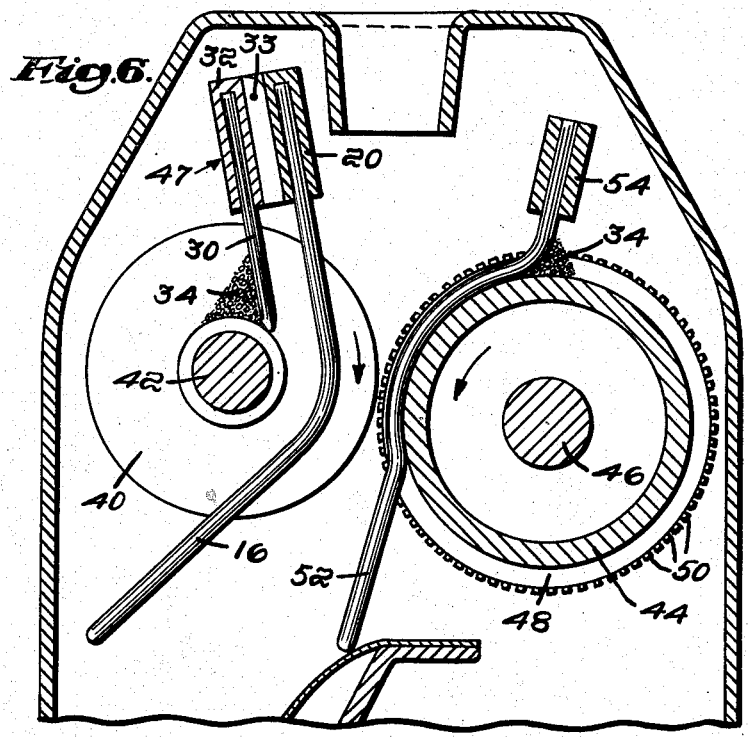
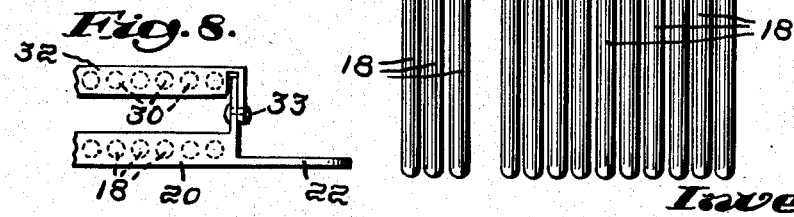
Inventor:
William F. Spang,
by Kenway, Jenney, Witter & Hildreth
Attorneys Patented Apr. 3, 1951

2,547,234

UNITED STATES PATENT OFFICE 2,547,234

MEAT TENDERIZING MACHINE

William F. Spang, Milton, Mass., assignor to Cube Steak Machine Co., Needham Heights, Mass., a partnership Application July 16, 1948, Serial No. 39,069

11 Claims. (Cl. 17—26)

This invention relates to improvements in machines for tenderizing meat, particularly steaks. Such machines employ one or more rotary gangs of coaxial and relatively spaced disk-like knives which sever the sinews and tenderize the meat as it is passed through the machine. Continuous operation of the machine causes the formation of meat dust and particles which gather on and between the cutting knives. The primary object of the invention resides in the production of a knife cleaning unit cooperating with the knives for keeping them clean and eliminating this objection.

Stripping fingers are employed for stripping the meat from the knives after passing through the machine and my improved knife cleaning mechanism includes fingers preferably combined with and disposed rearwardly of the stripping fingers to remove meat particles from the knives before they make contact with the meat. The production of an improved combination of this nature as hereinafter more specifically described comprises a further object of the invention.

These and other features of the invention will be best understood and appreciated from the following description of preferred embodiments thereof selected for purposes of illustration and shown in the accompanying drawings in which:

Fig. 1 is a sectional view through a meat tenderizing machine embodying the invention, Fig. 2 is a fragmentary view taken on line 2—2 of Fig. 1, Fig. 3 is a fragmentary view taken on line 3—3 of Fig. 1, Fig. 4 is an end elevation of the stripping comb and cleaning finger unit, Fig. 5 is a like view showing the cleaning fingers in another position, Fig. 6 is a fragmentary sectional view of a modified construction, Fig. 7 is a front elevation of the stripping comb and cleaning finger unit, partially broken away, Fig. 8 is a fragmentary plan view thereof, and Fig. 9 is an end elevation of the unit supporting frame.

Referring first to Figs. 1–5 of the drawings, 10 indicates a housing within which are mounted two rotary shafts 12 each provided with a gang of meat cutting and tenderizing knives. While I have illustrated continuous disk cutters 14 on one shaft and interrupted disk-like cutters 15 on the other shaft, it will be understood that any desired arrangement may be employed. Means is provided for rotating the shafts in the opposite directions indicated by the arrows. Meat to be treated is fed downwardly between the two sets of knives and relatively long stripping fingers 16 and 18 are disposed between the shafts and knives for guiding the meat and stripping it from the knives.

Continuous operation of the machine causes the formation of meat dust and particles which gather on and between the cutting knives. If allowed to accumulate this formation interferes with the cutting efficiency of the knives and produces an unsanitary condition. The primary feature of the invention relates to a novel combination of cleaning fingers associated with the knives and preferably forming a unit with the stripping fingers. As illustrated in the drawings, each set of stripping fingers 16 and 18 is supported on and along a bar 20 having its two ends 22 extending outwardly beyond the fingers. The shafts 12 are mounted in two uprights 24 at the ends of the machine and a plate 26 is mounted on each upright. The plates are slotted at 28 to receive the ends 22 of the bar in position to support the bars and stripping fingers as shown in Fig. 1.

A comb of cleaning fingers 30 is associated with each gang of cutters and each comb embodies a plurality of relatively short fingers supported on a bar 32 pivoted to the bar 20 at 33, the cleaning fingers being substantially parallel with the stripping fingers and in alignment therewith transversely whereby to extend between the cutters. As illustrated in Figs. 1 and 2, the cleaning fingers are disposed rearwardly of the stripping fingers, relative to the direction of rotation of the cutters, and are of a width and length to span the gap between adjacent knives. Furthermore, the cleaning fingers are so disposed that their free ends rest by gravity on the bottom walls of the gaps between the knives and contact such walls at the downwardly moving sides of the shafts. Such contact tends to draw the cleaning fingers downwardly and maintain close and continuous contact at their ends.

The disk-like knives are held in spaced relation on the shafts 12 by annular spacers on the shafts between the knives, the spacers forming the bottom walls of the gaps between the knives. The cleaning fingers 30 are of a width substantially equal to the spacing of adjacent knives and of a length extending substantially to the spacers and entirely above the rotary axis of the shaft 12, the free ends of the fingers preferably being in direct contact with the spacers.

As will be apparent, the cleaning fingers clean the meat particles from the knives in advance of their engagement with the meat fed between the knives, and these particles accumulate at 34 rearwardly of the cleaning fingers. The units, including the bars 20 and 32, are freely removable merely by lifting them from the slots 28 and they are pivotally movable relative to each other to the position of Fig. 5 for easy and thorough cleaning. The cutters can thus be thoroughly cleaned by flushing with water with the gang cut- In Fig. 6 I have illustrated a modified construction employing a gang of disk cutters 40 on a shaft 42 and a cooperating meat supporting roll 44 on a shaft 46. A meat stripping and cleaning finger unit 47 cooperates with the cutters 40 similar to that cooperating with the cutters 14 in Fig. 1. The roll 44 is annularly grooved at 48 and provided with meat engaging projections 50 on its periphery between the grooves. A comb of meat stripping fingers 52 is mounted in the grooves 48. The fingers 52 are carried on a bar 54 supported at its ends in two slots 28. All stripping and cleaning units are removable for cleaning purposes merely by lifting the bars upwardly from the supporting slots.

Having thus disclosed my invention, I claim as new and desire to secure by Letters Patent:

1. In a meat tenderizing machine, a rotary gang of disk-like knives mounted in spaced relation providing gaps therebetween on and along a shaft, spacers on the shaft respectively between the knives and forming the bottom walls of the gaps, means parallel with the gang and cooperating with its periphery in supporting and conducting meat therebetween and in cutting contact with the knives, fingers disposed between adjacent knives and extending between the spacers and the first named means for stripping the cut meat from the knives, and cleaning fingers disposed rearwardly of the fingers and extending downwardly between the knives above the shaft, said cleaning fingers being of a width substantially equal to the spacing of adjacent knives and of a length extending substantially to the spacers and entirely above the rotary axis of the shaft.

2. The meat tenderizing machine defined in claim 1 in which the free ends of the cleaning fingers rest by gravity on said bottom walls of the gaps between the knives.

3. The meat tenderizing machine defined in claim 2 in which the cleaning fingers contact said bottom walls at downwardly moving portions thereof, thereby maintaining the fingers in close contact with such walls.

4. The meat tenderizing machine defined in claim 1 plus an elongated bar disposed above the gang of knives and supporting the stripping fingers and cleaning fingers depending therefrom, and means at its ends for removably supporting the bar.

5. The meat tenderizing machine defined in claim 4 in which said bar is in two pieces respectively carrying the stripping fingers and cleaning fingers and pivoted together on an axis disposed longitudinally of the bar.

6. In a meat tenderizing machine, two cooperating and parallel units each embodying a rotary gang of disk-like knives mounted in spaced relation providing gaps therebetween on and along a shaft, spacers on the shaft respectively between the knives and forming the bottom walls of the gaps, the peripheral portion of the knives of the two units overlapping at a plane extending through the rotary axes of the two units, fingers disposed between the blades of the two units for stripping meat therefrom after it has passed between the units, and cleaning fingers extending into and substantially filling the gaps between the knives rearwardly of the stripping fingers, the free ends of the cleaning fingers being disposed above said axes.

7. The meat tenderizing machine defined in claim 6 in which the stripping fingers extend downwardly between the rotary axes of the two units and the free ends of the cleaning fingers rest by gravity on portions of the bottom walls of said gaps that are rotated downwardly, thereby maintaining the cleaning fingers in close contact with such walls.

8. In a meat tenderizing machine, a frame, a gang of disk-like knives mounted in spaced relation providing gaps therebetween on and along a shaft rotatably mounted in the frame, spacers on the shaft respectively between the knives and forming the bottom walls of the gaps, an elongated bar, means supporting the bar at its ends on the frame disposed along and above said gang, meat stripping fingers carried by the bar and extending downwardly through the gang between the knives, and relatively shorter cleaning fingers carried by the bar rearwardly of the stripping fingers and extending downwardly between the knives and having their free ends in contact with the bottom walls of the gaps between the knives.

9. The machine defined in claim 8 in which the cleaning fingers are substantially parallel with the stripping fingers and having said free ends in contact with downwardly moving portions of the walls, thereby tending to maintain the bar and fingers in seated position downwardly.

10. A stripping comb and cleaning finger unit for meat treating machines, comprising an elongated bar, a row of uniformly spaced meat stripping fingers carried by and extending laterally outward from the bar, a row of relatively shorter knife cleaning fingers carried by the bar, the cleaning fingers being spaced from and disposed respectively in alignment with the stripping fingers transversely of the bar, the bar extending outwardly beyond the fingers at its ends and being adapted to be supported at such ends adjacent to a rotary gang of coaxial and relatively spaced disk-like knives with the fingers extending between the knives.

11. In a meat tenderizing machine, a frame, a gang of disk-like knives mounted in spaced relation providing gaps therebetween on and along a shaft rotatably mounted in the frame, spacers on the shaft respectively between the knives and forming the bottom walls of the gaps, an elongated bar, a row of knife cleaning fingers carried by and spaced uniformly along and extending laterally outward from the bar, and means supporting the bar at its ends on the frame disposed along and above said gang with the fingers extending downwardly in the gaps between the knives and with their free ends in contact with the bottom walls of the gaps at one side of a vertical plane passing through the rotary axis of the gang.

WILLIAM F. SPANG.

REFERENCES CITED

The following references are of record in the file of this patent:

FOREIGN PATENTS

| Number | Country | Date |
|---|---|---|
| 692,605 | Germany | June 22, 1940 |